US009199227B2

(12) United States Patent
Garnier et al.

(10) Patent No.: US 9,199,227 B2
(45) Date of Patent: Dec. 1, 2015

(54) METHODS OF PRODUCING CONTINUOUS BORON CARBIDE FIBERS

(75) Inventors: John E. Garnier, Idaho Falls, ID (US); George W. Griffith, Idaho Falls, ID (US)

(73) Assignee: ADVANCED CERAMIC FIBERS, LLC, Idaho Falls, ID (US)

( * ) Notice: Subject to any disclaimer, the term of this patent is extended or adjusted under 35 U.S.C. 154(b) by 425 days.

(21) Appl. No.: 13/215,967

(22) Filed: Aug. 23, 2011

(65) Prior Publication Data
US 2013/0048903 A1 Feb. 28, 2013

(51) Int. Cl.
*C04B 35/00* (2006.01)
*B01J 27/22* (2006.01)
*B32B 9/04* (2006.01)
*C01B 31/36* (2006.01)
*D01F 9/08* (2006.01)
*C04B 35/10* (2006.01)
*C04B 35/563* (2006.01)
*C04B 35/565* (2006.01)
(Continued)

(52) U.S. Cl.
CPC . *B01J 27/22* (2013.01); *B32B 9/04* (2013.01); *C01B 31/36* (2013.01); *C04B 35/10* (2013.01); *C04B 35/563* (2013.01); *C04B 35/565* (2013.01); *C04B 35/583* (2013.01); *C04B 35/58071* (2013.01); *C04B 35/6286* (2013.01); *C04B 35/62277* (2013.01); *C04B 35/803* (2013.01); *C04B 35/806* (2013.01); *C22C 49/14* (2013.01); *D01F 9/08* (2013.01); *C04B 2235/46* (2013.01); *C04B 2235/48* (2013.01); *C04B 2235/5212* (2013.01); *C04B 2235/5248* (2013.01); *C04B 2235/5264* (2013.01); *C04B 2235/79* (2013.01); *C09K 5/14* (2013.01); *Y10T 428/2916* (2015.01)

(58) Field of Classification Search
CPC .......... B01J 27/22; B01J 19/00; C04B 35/563
USPC .............. 501/87, 94, 95.1, 96.1, 99; 427/585, 427/590, 429.1, 249.4, 249.5
See application file for complete search history.

(56) References Cited

U.S. PATENT DOCUMENTS 2,784,112 A 3/1957 Nicholson
3,028,256 A * 4/1962 Simnad .................. 427/228
(Continued)

FOREIGN PATENT DOCUMENTS

CN 2700346 Y 5/2005
EP 0603888 6/1994
(Continued)

OTHER PUBLICATIONS

Dacic et al., "Thermodynamics of gas phase carbothermic reduction of boron-anhydride," Journal of Alloys and Compounds 413 (2006) 198-205.
(Continued)

Primary Examiner — Jane L Stanley
(74) Attorney, Agent, or Firm — Workman Nydegger

(57) ABSTRACT

Methods of producing continuous boron carbide fibers. The method comprises reacting a continuous carbon fiber material and a boron oxide gas within a temperature range of from approximately 1400° C. to approximately 2200° C. Continuous boron carbide fibers, continuous fibers comprising boron carbide, and articles including at least a boron carbide coating are also disclosed.

28 Claims, 1 Drawing Sheet

(51) Int. Cl.
  *C04B 35/58* (2006.01)
  *C04B 35/583* (2006.01)
  *C04B 35/622* (2006.01)
  *C04B 35/628* (2006.01)
  *C04B 35/80* (2006.01)
  *C22C 49/14* (2006.01)
  *C09K 5/14* (2006.01)

(56) References Cited

U.S. PATENT DOCUMENTS

| | | |
|---|---|---|
| 3,166,614 A | 1/1965 | Taylor |
| 3,369,920 A | 2/1968 | Bourdeau et al. |
| 3,386,840 A | 6/1968 | Gruber |
| 3,427,222 A | 2/1969 | Biancheria et al. |
| 3,519,472 A | 7/1970 | Dyne et al. |
| 3,535,080 A * | 10/1970 | Van Der Pyl ............... 423/291 |
| 3,725,533 A | 4/1973 | Economy et al. |
| 3,808,087 A | 4/1974 | Milewski et al. |
| 3,813,340 A | 5/1974 | Knippenberg et al. |
| 3,825,469 A | 7/1974 | Economy et al. |
| 3,925,151 A | 12/1975 | Klepfer |
| 4,013,503 A | 3/1977 | Knippenberg et al. |
| 4,022,662 A | 5/1977 | Gordon et al. |
| 4,209,334 A | 6/1980 | Panzera |
| 4,225,355 A | 9/1980 | Galasso et al. |
| 4,284,612 A | 8/1981 | Horne, Jr. et al. |
| 4,406,012 A | 9/1983 | Gordon et al. |
| 4,445,942 A | 5/1984 | Cheng et al. |
| 4,473,410 A | 9/1984 | Grubb et al. |
| 4,566,700 A | 1/1986 | Shiembob |
| 4,707,330 A | 11/1987 | Ferrari |
| 4,756,895 A | 7/1988 | Boecker et al. |
| 4,859,503 A | 8/1989 | Bouix et al. |
| 4,864,186 A | 9/1989 | Milewski et al. |
| 4,894,203 A | 1/1990 | Adamson |
| 4,908,340 A | 3/1990 | Frechette et al. |
| 4,921,725 A * | 5/1990 | Bouix et al. ............... 427/587 |
| 4,948,763 A | 8/1990 | Hayashida et al. |
| 4,971,673 A | 11/1990 | Weisweiler et al. |
| 5,063,107 A | 11/1991 | Birchall et al. |
| 5,067,999 A | 11/1991 | Streckert et al. |
| 5,116,679 A * | 5/1992 | Nadkarni et al. ............ 428/367 |
| 5,135,895 A | 8/1992 | Frechette et al. |
| 5,182,077 A | 1/1993 | Feinroth |
| 5,190,737 A | 3/1993 | Weimer et al. |
| 5,230,848 A | 7/1993 | Wallace et al. |
| 5,238,711 A | 8/1993 | Barron et al. |
| 5,268,946 A | 12/1993 | Bryan et al. |
| 5,304,397 A * | 4/1994 | Holzl et al. ............... 427/249.5 |
| 5,330,838 A * | 7/1994 | Dyer et al. ............... 428/408 |
| 5,340,417 A | 8/1994 | Weimer et al. |
| 5,354,527 A | 10/1994 | Frechette et al. |
| 5,364,660 A * | 11/1994 | Gabor et al. ............ 427/255.24 |
| 5,366,943 A | 11/1994 | Lipowitz et al. |
| 5,368,938 A | 11/1994 | Holzl et al. |
| 5,383,228 A | 1/1995 | Armijo et al. |
| 5,404,836 A * | 4/1995 | Milewski ............... 117/87 |
| 5,434,897 A | 7/1995 | Davies |
| 5,436,042 A | 7/1995 | Lau et al. |
| 5,449,421 A | 9/1995 | Hamajima et al. |
| 5,460,637 A | 10/1995 | Connolly et al. |
| 5,547,512 A * | 8/1996 | Gabor et al. ............... 118/718 |
| 5,618,510 A | 4/1997 | Okada et al. |
| 5,676,918 A | 10/1997 | Okada et al. |
| 5,814,840 A | 9/1998 | Woodall et al. |
| 5,922,300 A | 7/1999 | Nakajima et al. |
| 6,022,515 A | 2/2000 | Stole et al. |
| 6,030,698 A | 2/2000 | Burchell et al. |
| 6,110,279 A | 8/2000 | Kito et al. |
| 6,113,982 A | 9/2000 | Claar et al. |
| 6,261,509 B1 | 7/2001 | Barnard et al. |
| 6,316,051 B2 | 11/2001 | Okada |
| 7,041,266 B1 | 5/2006 | Angier et al. |
| 7,083,771 B2 | 8/2006 | Angier et al. |
| 7,125,514 B2 | 10/2006 | Okamura et al. |
| 7,687,016 B1 | 3/2010 | DiCarlo et al. |
| 7,700,202 B2 | 4/2010 | Easler et al. |
| 8,940,391 B2 | 1/2015 | Garnier et al. |
| 2002/0033545 A1 | 3/2002 | Marlowe |
| 2002/0058107 A1 | 5/2002 | Fareed et al. |
| 2006/0039524 A1 | 2/2006 | Feinroth et al. |
| 2006/0227924 A1 | 10/2006 | Hallstadius et al. |
| 2007/0064861 A1 | 3/2007 | Sterbentz |
| 2009/0032178 A1 | 2/2009 | Feinroth |
| 2009/0318280 A1 | 12/2009 | Mohammadi et al. |
| 2010/0120604 A1 | 5/2010 | Easler et al. |
| 2012/0087457 A1 | 4/2012 | Garnier et al. |
| 2012/0088088 A1 | 4/2012 | Garnier et al. |
| 2013/0048903 A1 | 2/2013 | Garnier et al. |

FOREIGN PATENT DOCUMENTS

| | | |
|---|---|---|
| JP | 50038700 | 4/1975 |
| JP | 06192917 | 7/1994 |
| JP | 2010143771 | 7/2010 |
| WO | WO9515564 | 6/1995 |

OTHER PUBLICATIONS

"High-Performance Synthetic Fibers for Composites," National Materials Advisory Board, Commission on Engineering and Technical Systems, National Research Council, Publication NMAB-458, Apr. 1992, 142 pages.

U.S. Appl. No. 13/178,854, filed Jul. 8, 2011 to Garnier et al., entitled "Composite Materials, Bodies and Nuclear Fuels Including Metal Oxide and Silicon Carbide and Methods of Forming Same."

U.S. Appl. No. 13/178,884, filed Jul. 8, 2011 to Garnier et al., entitled "Reactor Fuel Elements and Related Methods."

U.S. Appl. No. 12/901,309, filed Oct. 8, 2010 to Garnier et al., entitled "Methods of Producing Silicon Carbide Fibers, Silicon Carbide Fibers, and Articles Including Same."

U.S. Appl. No. 12/901,326, filed Oct. 8, 2010 to Garnier et al., entitled "Cladding Material, Tube Including Such Cladding Material and Methods of Forming the Same."

Chambers et al., "Development and Testing of PRD-66 Hot Gas Filters," DOE/MC/31214-97/C0734, Advanced Coal-Fired Power Systems '96 Review Meeting, Morgantown, West Virginia, Jul. 16-18, 1996, 8 pages.

U.S. Appl. No. 14/570,927, filed Dec. 15, 2014, Garnier et al.

U.S. Appl. No. 14/615,685, filed Feb. 6, 2015, Garnier.

"Abradable Coatings used for Gas Path Seals in Turbine Engines." Vac Aero International, Inc. Web. Accessed Dec. 3, 2014. http://vacaero.com/information-resources/vac-aero-news-and-training/products-news-training/633-abradable-coatings-for-gas-path-seals-in-turbine-engines.html.

Al-Olayyan, Y., et al., The Effect of Zircaloy-4 Substrate Surface Condition on the Adhesion Strength and Corrosion of SiC Coatings, Journal of Nuclear Materials, 2005, pp. 109-119, vol. 346, Elsevier B.V.

"An Innovative Ceramic Corrosion Protection System for Zircaloy Cladding," Year 3—4th Quarter Report (+6), Neri Research Project No. DE-FG03-99SF21882, Feb. 2003.

Belitskus, David, "Fiber and Whisker Reinforced Ceramics for Structural Application", Technology & Engineering, pp. 81-83 and 86-90, 1993.

Bye et al., "Occurrence of airborne silicon carbide fibers during industrial production of silicon carbide," Scand J. Work Environ health 11 (1985) 111-15.

Garnier, John, et al., Ex-Reactor Determination of Thermal Gap Conductance Between Uranium Dioxide and Zircaloy-4, Stage II: High Gas Pressure, Prepared for Nuclear Regulatory Commission, NUREG/CR-0330 PNL-3232, vol. 2, Jul. 1980, 78 pages.

Haibo et al., "Synthesis of a silicon carbide coating on carbon fibers by deposition of a layer of pyrolytic carbon and reacting it with silicon monoxide," Carbon 46 (2008 1339-1344.

"Hexoloy SA Silicon Carbide, Technical Data," Saint-Gobain Advanced Cermics, 2003, 4 pages.

"Hi-Nicalon Ceramic Fiber," COI Ceramics, Inc., Jan. 2006, 2 pages.

(56) References Cited

OTHER PUBLICATIONS

"Hi-Nicalon Type S Ceramic Fiber," COI Ceramics, Inc., Jan. 2006, 2 pages.
Jayaseelan et al., "In Situ Formation of Silicon Carbide Nanofibers on Cordierite Substrates," J. Am. Ceram. Soc., 90 [5] 1603-1060 (2007).
Milewski, "Growth of Beta-Silicon Carbide Whiskers by the VLS Process", Journal of Materials Science 20, 1985, pp. 1160-1166.
Mortensen, Andrew, "Concise Encyclopedia of Composite Materials", Technology & Engineering, pp. 866-869, Dec. 8, 2003.
Okada et el., "Preparation of Silicon Carbide Fiber from Activated Carbon Fiber and Gaseous Silicon Monoxide", Ceramic Engineering & Science Proceedings, 1995, pp. 45-54.
Okada et el., "Preparation of Silicon Carbide Fiber from Activated Carbon Fiber and Gaseous Silicon Monoxide", Communications of the American Ceramic Society, Jun. 1994, pp. 1691-1693.
PCT International Search Report and Written Opinion of the International Searching Authority for PCT/US11/55025, dated Feb. 27, 2012, 7 pages.
PCT International Search Report and Written Opinion of the International Searching Authority for PCT/US11/55031, dated Feb. 13, 2012, 10 pages.
Ryan et al., "The Conversion of Cubic to Hexagonal Silicon Carbide as a Function of Temperature and Pressure" USAF, 1967.
Schricker, Bob, "Using Fiber Metal Abradable Seals in Aerospace Turbine Applications." Defense Tech Briefs. Technetics Group, EnPro Industries companies, Oct. 1, 2011. Web. Accessed Dec. 3, 2014. https://www.technetisgroup.com/bin/AbradableSeals_AerospaceApplications.pdf.
"Silar® SiC Whiskers for Ceramic Systems", www.acm-usa.com/Pages/Materials/details.apx?fsid=0, 1 pg.
"Sylramic SiC Fiber," COI Ceramics, Inc., Jan. 2006, 2 pages.
"UBE Tyranno Fibers," Engineering Ceramics, 2005, 3 pages.
Wikipedia entry, "Activated Carbon", http://en.wikipedia.org/wiki/Activated_carbon, Accessed Sep. 25, 2013, 15 pages.
Wikipedia entry, "Vapor-liquid-solid method", http://en.wikipedia.org/wiki/Vapor-Liquid-Solid<method, Accessed Oct. 9, 2013, 7 pages.
Wilson, Scott, "Ensuring Tight Seals", Sulzer Innotec Abradable Test Facility. Sulzer Innotec, Feb. 2007. Web. Accessed Dec. 3, 2014. http://www.sulzer.com/en/-/media/Documents/Cross_Division/STR/2007/2007_2_23_wilson_e.pdf.
U.S. Appl. No. 12/901,309, Apr. 20, 2011, Restriction Requirement.
U.S. Appl. No. 12/901,309, Jun. 13, 2011, Office Action.
U.S. Appl. No. 12/901,309, Oct. 27, 2011, Final Office Action.
U.S. Appl. No. 12/901,309, Jan. 12, 2012, Advisory Action.
U.S. Appl. No. 12/901,309, Apr. 2, 2012, Office Action.
U.S. Appl. No. 12/901,309, Apr. 16, 2013, Final Office Action.
U.S. Appl. No. 12/901,326, Aug. 12, 2013, Restriction Requirement.
U.S. Appl. No. 12/901,309, Nov. 7, 2013, Office Action.
U.S. Appl. No. 12/901,326, Nov. 18, 2013, Office Action.
U.S. Appl. No. 12/901,309, Jun. 30, 2014, Office Action.
U.S. Appl. No. 12/901,326, Sep. 11, 2014, Final Office Action.
U.S. Appl. No. 12/901,309, Sep. 16, 2014, Notice of Allowance.
U.S. Appl. No. 12/901,326, May 15, 2015, Office Action.

\* cited by examiner

METHODS OF PRODUCING CONTINUOUS BORON CARBIDE FIBERS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

FIELD

The disclosure, in various embodiments, relates generally to methods of producing fibers of boron carbide. More specifically, the disclosure, in various embodiments, relates to methods of producing boron carbide in continuous fiber form, continuous boron carbide fibers, and articles including the continuous boron carbide fibers.

BACKGROUND

Boron carbide has extremely high hardness and modulus of elasticity and is used as a lightweight, high performance high temperature material. Powder and fiber forms of boron carbide are known. However, fibers of boron carbide are expensive and have a large diameter. Monolithic (non-fiber) forms of boron carbide are used at temperatures of up to at least 2100° C. in inert environments. Monolithic boron carbide has been used to make hundreds of thousands of personal body armor plates and also finds use in military and private vehicles where ballistic protection and lowest weight are of high importance. Monolithic boron carbide has also been used in nuclear moderator applications due to its recognized neutron moderation properties. However, for use in nuclear applications, the monolithic boron carbide requires an additional material to encase the boron carbide, such as a stainless steel sheathing.

Boron carbide powder is formed by reacting carbon with boron trichloride ($BCl_3$) in the presence of hydrogen at 800° C. according to the following reaction: $C(s)+4\ BCl_3(g)+6H_2(g) \rightarrow B_4C(s)+12\ HCl(g)$. This chemistry-driven process involves gas-solid heterogeneous reactions and is used in making boron carbide powder that contains excess carbon. Boron carbide powder is then compacted with a sintering aid and sintered at a temperature greater than 2000° C. to form various articles, such as plates, tubes, nozzles. Boron carbide fibers are formed by a carbothermal reduction reaction of boron and carbon powders in slurries placed on carbon, or deposited as a coating using a chemical vapor deposition (CVD) process. The CVD process deposits boron on carbon fibers or boron carbide directly onto carbon fibers using boron halides or diborane with methane or another chemical carbon source. The CVD process produces relatively large diameter (4 mm to 5.6 mm) fibers. The articles produced that include these boron carbide fibers usually contain excess boron or carbon.

One method of forming boron carbide fibers includes forming a pyrolytic coating on carbon or graphite filaments. The pyrolytic coating is applied to the filaments at reduced pressure and at a temperature between 1300° C. and 2100° C. A source gas that includes a hydrocarbon and a halide of boron is decomposed on the filaments to form the pyrolytic coating.

Another method of forming boron carbide fibers includes heating boric oxide fibers in an ammonia atmosphere to a temperature of 350° C. to 600° C. to produce fibers that include boron, nitrogen, oxygen, and hydrogen. The ammonia-treated fibers are then heated in an amine atmosphere at a temperature of 600° C. to 1000° C. to produce fibers that include boron, carbon, nitrogen, oxygen, and hydrogen. The amine-treated fibers are then heated to a temperature of 2000° C.-2350° C. in an inert atmosphere, producing the boron carbide fibers.

Another method of forming boron carbide fibers includes using diboron trioxide ($B_2O_3$) powder. The powder is dispersed in a water slurry and cellulose fibers added to the water slurry. The $B_2O_3$ is dispersed in the cellulose matrix and carbonized to produce boron carbide fibers in which the $B_2O_3$ is dispersed in the cellulose matrix.

It would be desirable to produce continuous fibers of boron carbide exhibiting enhanced thermal, mechanical, and neutron adsorption properties for use in a variety of articles. Further, it would be desirable to produce continuous fibers of boron carbide of a very fine diameter. In addition, it would also be desirable to produce the continuous boron carbide fibers in an economical manner.

BRIEF SUMMARY

An embodiment of the present disclosure includes a method of producing continuous boron carbide fibers comprising reacting a continuous carbon fiber material and a boron oxide gas within a temperature range of from approximately 1400° C. to approximately 2200° C.

Another embodiment of the present disclosure includes a method of producing continuous boron carbide fibers comprising heating solid boron oxide in a reaction zone of a reaction chamber to a temperature of greater than approximately 600° C., increasing the temperature of the reaction zone to between approximately 1600° C. and approximately 2200° C., and drawing a continuous carbon fiber material through the reaction zone.

Yet another embodiment of the present disclosure includes a continuous boron carbide fiber that comprises a coating of boron carbide on a carbon fiber material. At least a portion of the coating of boron carbide includes carbon of the carbon fiber material.

Yet still another embodiment of the present disclosure includes a continuous fiber comprising boron carbide and having a diameter of from approximately 2 μm to approximately 20 μm.

Another embodiment of the present disclosure includes an article comprising fibers dispersed in a matrix. The fibers have a diameter of less than or equal to approximately 20 μm and comprise at least a boron carbide coating.

BRIEF DESCRIPTION OF THE DRAWINGS

While the specification concludes with claims particularly pointing out and distinctly claiming that which is regarded as the present invention, the advantages of embodiments of the disclosure may be more readily ascertained from the following description when read in conjunction with the accompanying drawings in which:

DETAILED DESCRIPTION

Figure 1:
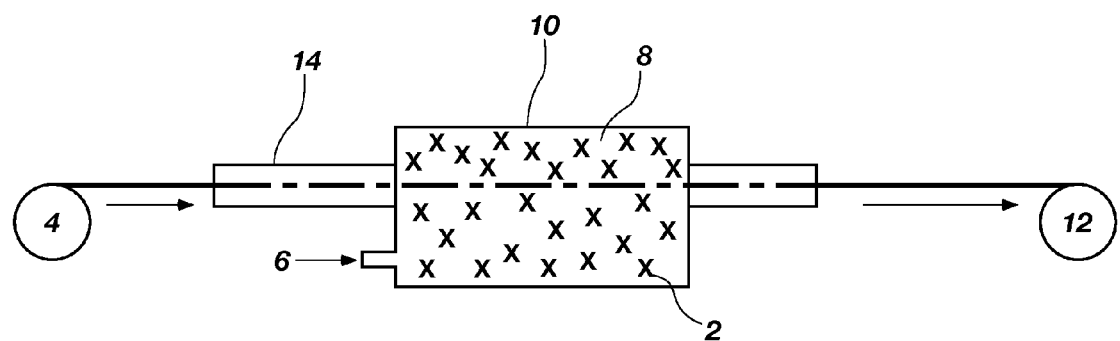
FIG. 1 is a schematic illustration of a reaction chamber utilized in a method to form continuous boron carbide fibers according to embodiments of the disclosure.

Methods of forming continuous fibers of boron carbide are disclosed, as are continuous boron carbide fibers and articles formed with the continuous boron carbide fibers. As used herein, the terms "continuous fibers" or "continuous boron carbide fibers" means and includes fibers that may be formed or manufactured to an indefinite length and, thus, are not process-constrained to any particular length other than a length of carbon fiber material feedstock employed. The continuous boron carbide fibers may then be used in an article, such as for a reinforcement in a matrix. As used herein, the term "boron carbide" means and include a chemical compound having at least one boron atom and at least one carbon atom, as indicated by the chemical formula $B_xC$, where x ranges from 4 atomic percent of boron in carbon to 10.4 atomic percent of boron in carbon. To form the continuous boron carbide fibers, a boron oxide gas and a carbon fiber material are reacted. By adjusting a reaction temperature, gaseous environment, and relative mole fractions of the boron oxide gas and carbon fiber material, the continuous boron carbide fibers may be formed. A reaction time may also be adjusted to form fully converted, continuous boron carbide fibers or partially converted, continuous boron carbide fibers. The continuous boron carbide fibers may exhibit a high chemical resistance, a high thermal conductivity, increased temperature capability, a high compression and tensile strength (from approximately 300 ksi to approximately 400 ksi (from approximately 2070 MPa to approximately 2760 MPa)), a high modulus (from approximately 30 Msi to approximately 70 Msi (from approximately 207 MPa to approximately 482 MPa), a high hardness (9.25 mohs), a low density (2.5 g/ml), a high melting point (2445° C.), reduction in warpage, and a high thermal neutron capture cross section (600 barn).

The continuous boron carbide fibers may include boron carbide that is boron rich, such as $B_{10.4}C$, or stoichiometric boron carbide, $B_4C$, which is the most stable form of boron carbide. In one embodiment, the continuous boron carbide fibers include $B_4C$, which includes 12 boron atoms and four carbon atoms arranged in a rhombohedral crystalline structure. The $B_4C$ continuous boron carbide fibers may be substantially formed from $B_4C$ (fully converted, continuous boron carbide fibers) or may include a coating of $B_4C$ over the carbon fiber material (partially converted, continuous boron carbide fibers). For convenience, the term "boron carbide" is used herein to refer to a chemical compound having the chemical formula $B_xC$ as defined above. In contrast, the term "$B_4C$" or other specific stoichiometry is used herein to refer to a specific boron carbide compound. The continuous fibers may be of a sufficient length to be woven, braided, or otherwise combined with other fibers, not limited to boron carbide or born carbide coated fibers, for use in an article or product. By way of example, the continuous fibers may have a length ranging from approximately five centimeters to a length of greater than or equal to approximately one meter. The term "continuous fibers" is used in contrast to discontinuous fibers, which have a discrete length as formed or manufactured, such as a length of less than approximately five centimeters. The continuous boron carbide fibers may be directly formed from a continuous carbon fiber material. As used herein, the term "directly formed" means and includes formation of the continuous boron carbide fibers from a carbon fiber feedstock material without additional post-processing acts. The continuous boron carbide fibers may be formed from individual filaments having a diameter of from approximately 1 μm to approximately 100 μm, such as from approximately 2 μm to approximately 20 μm. In one embodiment, the continuous boron carbide fibers have a diameter of from approximately 8 μm to approximately 10 μm. The continuous boron carbide fibers may include a count of from approximately 300 individual filaments to approximately 3000 individual filaments, such as from approximately 500 individual filaments to approximately 1000 individual filaments. In one non-limiting application, continuous boron carbide fibers may be formed into a weavable filament fiber tow form.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

The continuous boron carbide fibers may be formed by reacting the boron oxide gas and the carbon fiber material (a solid) as shown in the following reaction, Reaction 1:

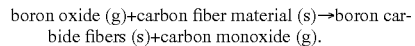

boron oxide (g)+carbon fiber material (s)→boron carbide fibers (s)+carbon monoxide (g).

The reaction may be conducted in the presence of a carrier gas. The reaction is a gas-solid phase reaction that results in the production of the continuous boron carbide fibers by an irreversible surface chemical exchange reaction between the carbon fiber material and the boron oxide gas. Reaction 1 is thermodynamically and kinetically driven and proceeds as a function of the reaction temperature, reaction time, and relative mole fractions of the boron oxide gas and carbon fiber material. Since the reaction to form the continuous boron carbide fibers is a gas-solid phase deposition reaction, the reaction may be conducted without a sintering aid, which reduces impurities in the continuous boron carbide fibers, and without utilizing high pressures. In addition to the continuous boron carbide fibers, carbon monoxide (CO) may be produced by the reaction. The boron oxide gas utilized in Reaction 1 may include at least one gaseous boron species having at least one boron atom and at least one oxygen atom as indicated by the chemical formula ($B_aO_b$), where each of a and b is an integer greater than or equal to 1 and less than or equal to 3. By way of example, the boron oxide gas may include diboron trioxide ($B_2O_3$), diboron dioxide ($B_2O_2$), boron monoxide (BO), or combinations thereof.

The carrier gas utilized in Reaction 1 may be an inert gas including, but not limited to, argon, helium, neon, xenon, or combinations thereof. The carrier gas may be used to maintain a low partial pressure of oxygen ($PO_2$) in a reaction chamber or furnace in which the reaction is conducted. The carrier gas may also be used to remove gaseous byproducts of the reaction, such as carbon monoxide. The gaseous byproducts may be removed from the reaction chamber by the flow of the carrier gas. The partial pressure of carbon monoxide in the reaction chamber may be controlled by running the reaction in a vacuum (a reduced system pressure) with the carrier gas. Removing the carbon monoxide or other gaseous byproducts may prevent the nucleation of $B_xC$ in the gas phase, enabling formation of $B_xC$ on or within the carbon fiber material. Additionally, removing the carbon monoxide may promote the formation of $B_2O_2$ and BO as the gaseous boron species and may enable BO to be produced at a lower temperature. The presence of carbon monoxide when forming the continuous boron carbide fibers may also affect the time-at-temperature kinetics of the reaction. Since the reaction chamber is vented to remove the carbon monoxide, the reaction chamber may be maintained at a pressure of less than or equal to approximately 1 atm during the reaction.

The carrier gas may be a high purity inert gas having a low residual oxygen content ($PO_2$), a low nitrogen content ($PN_2$), and a low water content ($PH_2O$), with each species at a relative partial pressure of less than approximately $1.01 \times 10^2$ Pascal (0.001 atm). Each of the oxygen, nitrogen, or water in the carrier gas may be present at a concentration of less than approximately 1000 parts per million (ppm). The carrier gas may also be a mixture of carbon monoxide and carbon dioxide, which includes a low concentration of oxygen, nitrogen, and water vapor, and may be used to produce a low oxygen partial pressure over the temperature ranges of the process (up to $PO_2=1\times 10^{-21}$ atm). The carrier gas may also be a combination of the inert gas, such as argon or helium, and a mixture of carbon monoxide and carbon dioxide. By utilizing a carrier gas of high purity, the resulting continuous boron carbide fibers may include relatively low concentrations of impurities, such as oxygen or nitrogen, which if present at high concentrations may have a negative effect in lowering both thermal and mechanical properties and may be a source of swelling during use of the continuous boron carbide fibers. In contrast, conventional processes of producing boron carbide fibers that utilize sintering aids result in significant oxygen and nitrogen impurities in the fibers, which affect the high temperature performance of the fibers.

In one embodiment, the carrier gas is argon and the continuous boron carbide fibers are formed according to the following reaction, Reaction 2:

$$B_aO_b \text{ (g)} + \text{carbon fiber material (s)} + \text{Ar (g)} \rightarrow \text{boron carbide fibers (s)} + \text{CO (g)} + \text{Ar (g)}$$

where a and b are as previously defined. The boron oxide gas may include at least one of $B_2O_3$, $B_2O_2$, and BO. To generate the boron oxide gas, a solid boron source may be placed in a container, such as in a boat, in the reaction chamber, and the reaction chamber heated. The solid boron source may be a high purity, boron oxide, such as $B_2O_3$, in a powder or other solid form. The solid boron source may be a high purity powder commercially available from a chemical supply company, such as from Sigma-Aldrich Co. (St. Louis, Mo.). The solid boron source may be relatively inexpensive, such as having a cost in the range of from approximately $5 per pound to approximately $30 per pound. The solid boron source may be heated to a temperature greater than approximately 600° C., producing gaseous boron species as indicated below:

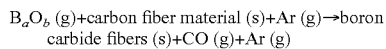

The boron oxide gas may include a combination of $B_2O_3$, $B_2O_2$, and BO, with the relative proportions or mole fractions of each of the gaseous boron species dependent on the reaction temperature. Since boron oxide, such as $B_2O_3$, is a solid below 500° C., gaseous boron species may not exit the reaction chamber because the temperature at an exit of the reaction chamber is less than approximately 100° C.

The solid boron source may be continuously added to the container in the reaction chamber and heated to produce a continuous source of the boron oxide gas, which enables continuous conversion of the carbon fiber material into the continuous boron carbide fibers. The solid boron source may be heated in the reaction chamber in which Reaction 1 or Reaction 2 is to be conducted. However, the boron oxide gas may also be produced in a separate reaction chamber or furnace and subsequently introduced into the reaction chamber in which Reaction 1 or Reaction 2 is to be conducted. The amount of boron oxide gas generated depends on the amount of solid boron source placed in the container. An initial amount of the solid boron source may be placed in the container and heated to produce the boron oxide gas. As the boron oxide gas is used, additional boron oxide gas may be generated by adding an additional amount of the solid boron source to the reaction chamber. The concentration of gaseous boron species generated by heating the solid boron oxide source may depend on the temperature to which the solid boron oxide source is heated. At a temperature of less than approximately 1650° C., the gaseous boron species may include a greater gaseous molar concentration of $B_2O_3$ relative to the gaseous molar concentration of $B_2O_2$, and a greater gaseous molar concentration of $B_2O_2$ relative to the amount of BO ($B_2O_3 > B_2O_2 > BO$). At a temperature of between approximately 1650° C. and approximately 1750° C., the gaseous boron species may include a greater gaseous molar concentration of $B_2O_2$ relative to the gaseous molar concentration of BO, and a greater gaseous molar concentration of BO relative to the amount of $B_2O_3$ ($B_2O_2 > BO > B_2O_3$). At a temperature of between approximately 1750° C. and approximately 2200° C., the gaseous boron species may include a greater gaseous molar concentration of BO relative to the gaseous molar concentration of $B_2O_2$, and a greater gaseous molar concentration of $B_2O_2$ relative to the amount of $B_2O_3$ ($BO > B_2O_2 > B_2O_3$). By way of example, at a temperature of up to approximately 1590° C., the gaseous boron species may include predominantly $B_2O_3$. $B_2O_3$ may be present in decreasing, gaseous molar concentration with $B_2O_2$ and BO up to a temperature of approximately 2200° C.

The carbon fiber material used in Reaction 1 or Reaction 2 may be a carbonaceous material that contains carbon in the form of graphite plates. The carbon fiber material has microscopic crystals axially aligned in long chains, such as a polyaromatic hydrocarbon (pitch resin) or a polyacrylonitrile (PAN) processed carbon. The pitch resin may be a mesophase pitch, isotropic pitch, rayon-based fibers, or gas-phase grown fibers. The carbon fiber material may also include carbon nanotubes. The carbon fiber material may be a multi-filament carbon tow and have individual filament diameters of from approximately 1 µm to approximately 100 µm, such as from approximately 2 µm to approximately 20 µm. The diameter of the carbon fiber material may be selected based on the desired diameter of the continuous boron carbide fibers to be produced. The carbon fiber material may be configured as continuous fibers (e.g., fibers that may be formed or manufactured to an indefinite length). The carbon fiber material may be of sufficient length to be fed or drawn through the reaction chamber. The carbon fiber material may be substantially pure in that the material predominantly includes carbon and hydrogen. By way of example, the carbon fiber material may have a purity of greater than approximately 99.5%. To prevent the formation of whiskers, minimal impurities (on the order of less than parts per million (ppm)), such as iron, may be present in the carbon fiber material. The carbon fiber material may also be relatively inexpensive, such as having a cost in the range of from approximately $30 per pound to approximately $100 per pound. In addition, large quantities of the carbon fiber material may be commercially available. The carbon fiber material may include a mixture of carbon-carbon single bonds, carbon-carbon double bonds, and carbon-carbon triple bonds. To provide sufficient reactivity, the carbon fiber material may include a greater proportion of carbon-carbon single bonds and carbon-carbon double bonds relative to carbon-carbon triple bonds. By way of example, the carbon fiber material may be a pitch-based resin, such as continuous pitch-based carbon fibers available from KUREHA Corporation (Tokyo, Japan) under the name SY-652 pitch based carbon yarn or from Mitsubishi Chemical U.S.A., Inc. (Tokyo, Japan) under the DIALEAD® tradename, such as DIALEAD® KS352U pitch-based carbon fibers. The carbon fiber material may also be a PAN-based carbon fiber, such as AS4C-GP and AS2C-GP or other carbon fibers available from HEXCEL Corporation (Salt Lake City, USA), T300 or other carbon fibers available from Toray Carbon Fibers America, Inc. (Santa Ana, Calif.), or SGL SIGRAFIL® carbon fibers available from SGL Carbon Fibers Ltd. (Gardena, Calif.). The carbon fiber material may be used in Reaction 1 or Reaction 2 without activation, as is required in conventional processes of producing boron carbide fibers.

The reaction to form the continuous boron carbide fibers may be conducted in a reaction zone of the reaction chamber, which is described in more detail below. The boron oxide gas, the carbon fiber material, and the carrier gas may be introduced into the reaction zone of the reaction chamber. The boron oxide gas may be flowed into the reaction chamber or, if the boron oxide gas is generated in situ from at least one solid precursor, the solid precursor(s) may be placed in the container in the reaction chamber. The carbon fiber material may be drawn through the reaction zone of the reaction chamber or furnace, which is described in more detail below in regard to FIG. 1. Reactions 1 or 2 may occur as the carbon fiber material is drawn into the reaction chamber containing the boron oxide gas. The carrier gas may be flowed into the reaction chamber at a sufficient flow rate to achieve the desired gaseous environment within the reaction chamber. The flow rate of the carrier gas at standard temperature and pressure conditions may range from approximately 0.001 m$^3$/min to approximately 0.01 m$^3$/min. Depending on the length of the reaction zone, which may range from inches to feet, the draw rate of the carbon fiber material through the reaction chamber may be from approximately 0.1 inch/minute to approximately 500 inches/min. By way of example, for a 6-inch reaction zone, the draw rate ranges from approximately 0.1 inch/minute to approximately 10 inches/minute to achieve fully to partially converted continuous boron carbide fibers. The reaction zone of the reaction chamber may be maintained at a temperature sufficient for the boron oxide gas to be formed from the solid boron source and for boron oxide gas and the carbon fiber material to react, such as at a temperature between approximately 1000° C. and approximately 2200° C., such as from approximately 1400° C. to approximately 1800° C., such as from approximately 1550° C. to approximately 1800° C. Depending on the temperature in the reaction chamber and the reaction time (time at temperature), the carbon fiber material may be partially converted or fully converted to boron carbide fibers, as described in detail below.

At a temperature of greater than approximately 1580° C., the continuous boron carbide fibers may be formed according to the following reaction, Reaction 4:

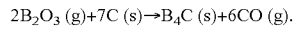

Reaction 4 is thermodynamically favored at a temperature between approximately 1400° C. and approximately 1650° C. At a temperature of less than approximately 1600° C., the continuous boron carbide fibers may be formed according to the following reaction, Reaction 5:

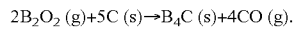

Reaction 5 is thermodynamically favored at a temperature between approximately 1650° C. and approximately 1750° C. when the gaseous molar concentration of $B_2O_2$ is greater than that of BO. At a temperature of greater than approximately 1700° C., the continuous boron carbide fibers may be formed according to the following reaction, Reaction 6:

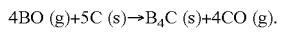

Reaction 6 is thermodynamically favored at a temperature between approximately 1650° C. and approximately 2200° C., such as between approximately 1650° C. and approximately 1750° C., when the gaseous molar concentration of BO is greater than that of $B_2O_2$.

The carbon fiber material may be reacted with the boron oxide gas in the reaction zone. The carrier gas may be used to control the gaseous environment in the reaction zone by enabling continuous removal of excess carbon monoxide and other gaseous byproducts from the reaction chamber. By continuously removing the gaseous byproducts, secondary gaseous reactions are not favored, which enables the concentration of the carbon fiber material to be maintained at less than or equal to approximately 50 atomic %, thus favoring the formation of the continuous boron carbide fibers. As the reaction is a continuous process within the reaction zone of the reaction chamber, both the carbon fiber material and the boron oxide gas may be continuously replenished depending on the draw rate (inches per minute) of the carbon fiber material and the length of the reaction zone.

Since the carbon fiber material is a continuous solid, the mole fraction of carbon fiber material present in the reaction zone of the reaction chamber may be greater than the mole fraction of boron oxide gas. The carbon fiber material may be present at a mole fraction of greater than approximately 3 moles of carbon fiber material per mole of boron oxide gas. To form the continuous boron carbide fibers, the mole fraction of carbon fiber material to boron oxide gas (C/B) may be greater than approximately 3 (greater than approximately 3 moles of carbon fiber material per mole of boron oxide gas), such as greater than or equal to approximately 3.5. By maintaining a high mole fraction of carbon fiber material to boron oxide gas or maintaining the temperature of the reaction chamber at less than or equal to 1800° C., the formation of elemental boron may be prevented, which prevents the exothermic reaction of elemental boron with excess oxygen.

During the reaction, carbon may diffuse out of the carbon fiber material while boron from the boron oxide gas may diffuse into the carbon fiber material and react with the carbon, forming the boron carbide fibers. Since the diffusion rates of boron and carbon are substantially similar due to their similar atomic diameters, any excess boron may diffuse to boron deficient or non-boron carbide regions of the carbon fiber material. With continuous carbon monoxide removal from the reaction surface, the chemical reaction kinetics may favor diffusion of the boron inward (e.g., into the carbon fiber material) and diffusion of carbon outward (e.g., from the carbon fiber material). The diffusion of the boron and carbon may continue as approximately 50% of the carbon diffuses outward from the interior of the carbon fiber material and is removed as carbon monoxide. Concurrently, the boron diffusing into the carbon fiber material may react with the carbon-carbon single bonds, the carbon-carbon double bonds, and the carbon-carbon triple bonds to form boron carbide, resulting in the production of the continuous boron carbide fibers. During the reaction, the resulting formation of the continuous boron carbide fibers may exhibit a volumetric expansion of up to approximately 2%. Due to the high surface area of the carbon fiber material and the micron diameter of the carbon fiber material, the reaction may proceed to completion in an amount of time ranging from approximately seconds to approximately minutes, such as less than approximately 10 minutes depending on the length of the reaction zone. However, the reaction time may also vary depending on the reaction temperature and whether partially converted, continuous boron carbide fibers or fully converted, continuous boron carbide fibers are to be formed. The single bonds between carbon-carbon atoms of the carbon fiber material may be readily broken, while the breaking of carbon-carbon double bonds and carbon-carbon triple bonds may proceed at a slower rate. Without being bound by a particular theory, as the carbon-carbon bonds of the carbon fiber material break, reaction with a boron atom from the boron oxide gas occurs, resulting in formation and growth of sub-micron grains of boron carbide within the filaments of the carbon fiber material. The boron of the boron oxide gas may be chemically bonded to carbon of the carbon fiber material. Within individual filaments of the carbon fiber material, the different, yet repeating, carbon-carbon bonds may be distributed in a manner such that at complete conversion, the continuous boron carbide fibers include sub-micron size boron carbide grains. The fine boron carbide grain structure is believed to provide individual filaments of the continuous boron carbide fibers with mechanical strength.

In one embodiment of forming the continuous boron carbide fibers at a temperature of from 1600° C. to 1800° C., the CB may be greater than approximately 3.5 at the onset of the direct formation reaction to form $B_4C$. A CB of greater than approximately 3.2 may favor direct formation of $B_4C$. During the reaction, as additional gaseous boron species come into contact with a just-formed uniform $B_4C$ coating on the carbon fiber material, additional boron oxide may deposit on the surface of the carbon fiber material and dissociate in the presence of carbon to boron and oxygen. Boron has an atomic diameter similar to that of carbon, which leads to similar interdiffusion rates of boron and carbon during the production of the continuous boron carbide fibers. Chemical affinities enable further formation of $B_4C$ from the carbon fiber material and the boron oxide gas since remaining interior carbon resides as bonded carbon at the inner core of the carbon fiber material. Any residual oxygen present within the carbon fiber material, such as from the gaseous boron species, may also react with the carbon-carbon bonds at a temperature above 600° C., forming small amounts of carbon monoxide gas, which may be continuously removed from the reactant zone. Due to the robustness of the boron-carbon reaction, $B_4C$ is formed within the desired temperature range rather than forming other boron-carbon polymorphs.

The continuous boron carbide fibers produced by the method of the present disclosure may predominantly include $B_4C$, such as including greater than approximately 99% $B_4C$. However, by adjusting the reaction temperature, gaseous environment, and relative mole fractions of the starting materials, as previously described, other stoichiometries of boron carbide may be produced, which may be incorporated into article in a similar manner as previously described depending on the intended use of the continuous boron carbide fibers.

Depending on the extent to which the reaction proceeds, the carbon fiber material may be fully converted or partially converted into the continuous boron carbide fibers. By adjusting the conditions within the reaction zone, such as the reaction temperature, the draw rate, or reaction time, the continuous boron carbide fibers that are formed may be on a continuum of partially converted, continuous boron carbide fibers to fully converted, continuous boron carbide fibers. The degree of conversion may affect the tensile strength and modulus of the continuous boron carbide fibers. The fully converted, continuous boron carbide fibers may have a higher tensile strength and modulus than the partially converted, continuous boron carbide fibers. Therefore, by controlling the degree of conversion of the carbon fiber material to the continuous boron carbide fibers, these properties of the continuous boron carbide fibers may be controlled.

If the reaction conditions are such that the reaction proceeds to substantial completion, fully dense or fully converted, continuous boron carbide fibers may be formed. The fully converted, continuous boron carbide fibers may be formed by slowly pulling or drawing the carbon fiber material through the reaction zone of the reaction chamber, which contains the boron oxide gas and the carrier gas. By enabling the carbon fiber material and the boron oxide gas to be in contact for a longer period of time, i.e., by increasing the reaction time, the carbon fiber material may be fully converted into the continuous boron carbide fibers. The fully converted, continuous boron carbide fibers, depending on polymorph, may have a theoretical density of from approximately 2.35 g/ml (beta boron carbide) to approximately 2.46 g/ml (alpha boron carbide), with tetragonal boron carbide having a theoretical density of 2.36 g/ml. The alpha, beta, and tetragonal polymorphs are based on $B_{12}$ icosahedra and may form at low pressures of the method of producing the continuous boron carbide fibers according to embodiments of the present disclosure. For comparison, an orthorhombic phase of boron carbide (theoretical density=2.52 g/ml) forms only at high compressive pressure. The fully converted, continuous boron carbide fibers may achieve a direct conversion density of greater than about 95%, such as greater than about 98%. As the reaction proceeds, the diameter or length of the carbon fiber material may exhibit minimal dimensional changes in diameter or length relative to the diameter or length of the carbon fiber material.

When forming the fully converted, continuous boron carbide fibers, greater than approximately 99.8% of the carbon from the carbon fiber material and the boron from the boron oxide gas may be reacted. The reaction may proceed until substantially all of the carbon of the carbon fiber material has been reacted with the boron of the boron oxide gas (unless a partial conversion is desired) and the drawn continuous boron carbide fibers may be removed from the reactant zone. Since the diffusion rates of boron and carbon are substantially similar, elemental boron and elemental carbon may interdiffuse until boron has penetrated substantially all of the carbon fiber material, enabling the boron to react with substantially all of the carbon. Therefore, the fully converted, continuous boron carbide fibers may include a substantially homogenous boron carbide material. In one embodiment, the fully converted, continuous boron carbide fibers are substantially homogeneous $B_4C$.

If the conditions within the reaction zone are maintained such that the reaction does not proceed to substantial completion, the partially dense or partially converted, continuous boron carbide fibers may be formed. The partially converted, continuous boron carbide fibers may include a coating or film of boron carbide on a core of the carbon fiber material. The partially converted, continuous boron carbide fibers may be formed by quickly pulling or drawing the carbon fiber material through the reaction zone of the reaction chamber, which contains the boron oxide gas and the carrier gas. The kinetics of the process time (time at temperature) may be controlled by the draw rate of the carbon fiber material through the reaction zone. For instance, by drawing the carbon fiber material through the reaction zone quickly, the reaction of the carbon fiber material and the boron oxide gas may not proceed to completion, producing the partially converted, continuous boron carbide fibers. In the partially converted form, the boron carbide coating or film may be formed over a core of the carbon fiber material. The carbon fiber material underlying the boron carbide coating may be substantially unreacted with boron and remain in its initial carbon form. Since the boron of the boron oxide gas reacts with the carbon of the carbon fiber material, at least a portion of the coating of boron carbide may include carbon from the carbon fiber material. The partially converted, boron carbide fibers may provide enhanced environmental oxygen protection to the continuous boron carbide fibers when used at high temperatures because, in the presence of oxygen, an outer boron carbide coating may react to form an oxidative protective layer, such as boron trioxide. A thickness of the boron carbide coating on the core of the carbon fiber material may depend on the reaction time and the reaction temperature. By way of example, the thickness of the boron carbide coating on a 10 µm diameter carbon fiber material may be from approximately 0.001 µm to approximately 1 µm. Given a constant reactant atmosphere, the thickness of the boron carbide coating may also depend on the draw rate of the carbon fiber through the reaction zone.

By way of example, to form fully converted, continuous boron carbide fibers, solid $B_2O_3$ may be placed in the reaction zone of the reaction chamber and the reaction zone heated to a temperature of approximately 1750° C., producing gaseous $B_2O_3$, $B_2O_2$, and BO. The carbon fiber material may be drawn through the reaction zone containing the gaseous boron species. The gaseous boron species may initially react with an outer portion of the carbon fiber material, producing a layer of boron carbide on the carbon fiber material. The temperature in the reaction zone may then be decreased, such as to 1650° C. The boron may diffuse further into the carbon fiber material, continuing the conversion of the carbon fiber material to boron carbide. As the carbon fiber material is converted to boron carbide, any carbon remaining in the carbon fiber material is substantially present in an inner portion of the carbon fiber material. The boron may continue to diffuse into the inner portion of the carbon fiber material and react with the carbon. Once substantially no free carbon remains in the carbon fiber material (i.e., substantially all of the carbon fiber material has been converted to boron carbide), the reaction may be substantially complete and result in the formation of the fully converted, continuous boron carbide fibers.

By way of example, to form partially converted, continuous boron carbide fibers, the solid $B_2O_3$ may be placed in the reaction zone of the reaction chamber and the reaction zone heated to a temperature of approximately 1750° C., producing gaseous $B_2O_3$, $B_2O_2$, and BO. The carbon fiber material may be drawn through the reaction zone containing the gaseous boron species. The boron of the gaseous boron species may initially react with an outer portion of the carbon fiber material, producing a layer of boron carbide on the carbon fiber material. The boron of the boron oxide gas may continue to diffuse into the inner portion of the carbon fiber material and react with the carbon, continuing the conversion of the carbon fiber material to boron carbide. Once the desired amount of carbon of the carbon fiber material has been converted to boron carbide, the continuous boron carbide fibers may be removed from the reaction zone, terminating the reaction and resulting in the formation of the partially converted, continuous boron carbide fibers.

The continuous boron carbide fibers may include crimps, which cause weakening of the fiber properties. The presence of crimps may be reduced or eliminated by tensioning the continuous boron carbide fibers at an elevated temperature after formation. The continuous boron carbide fibers may be straightened at a temperature of approximately 2100° C. and at a tensile stress of from approximately 20.7 MPa to approximately 27.6 MPa (from approximately 3000 psi to approximately 4000 psi), which improves their mechanical properties.

The reaction chamber in which the continuous boron carbide fibers are produced may be a conventional high temperature tube furnace. The reaction chamber may be a continuous horizontal furnace or a continuous vertical furnace. Such furnaces are known in the art and, therefore, are not described in detail herein. By way of example, the reaction chamber may be a high temperature tube furnace that has been modified for continuous throughput processing of the carbon fiber material. The continuous boron carbide fibers may be produced in the hot tube section of the furnace, which functions as the reaction zone in which the reaction temperature and partial pressure of oxygen are controlled. By way of example, the tube may be formed from aluminum oxide, silicon carbide, boron carbide, or zirconium oxide. The tube entrance and exit ports may be water-cooled to maintain the desired entrance and exit room temperature during the reaction. The tube may also have end cap enclosures at both ends to enable the carrier gas to be injected into the tube and vented from the reaction chamber, and to provide an entrance port and exit port for the carbon fiber material. The atmosphere within the tube may be maintained at a slight positive pressure of from approximately 1 psig to approximately 10 psig to prevent an external atmosphere, such as air, from entering into the tube. As shown in FIG. 1, a boron oxide gas 2, a carbon fiber material 4, and a carrier gas 6 may be introduced into a reaction zone 8 of a furnace 10. As illustrated in FIG. 1, the boron oxide gas 2 is generated in situ in the furnace 10, such as by placing solid $B_2O_3$ in the reaction zone 8 of the furnace 10 and heating the solid $B_2O_3$ as previously described. However, the boron oxide gas 2 may also be flowed into the reaction zone 8 of the furnace 10 from an external source (not shown) of the boron oxide gas 2. The carrier gas 6 may also be flowed into the reaction zone 8 of the furnace 10. The carbon fiber material 4 may be drawn or pulled through the reaction zone 8 of the furnace 10 at a sufficient rate to enable the carbon fiber material 4 and the boron oxide gas 2 to react and produce the continuous boron carbide fibers 12, such as the fully converted, continuous boron carbide fibers or the partially converted, continuous boron carbide fibers. To provide sufficient time for the reaction to occur, the length of the reaction zone 8 may range from approximately five inches to approximately five hundred inches, the latter of which is a length of a reaction zone in an industrial scale production furnace. As the process is kinetically driven, a longer reaction zone may enable the carbon fiber material 4 to be drawn through the reaction zone 8 at a faster rate. To enable individual tows, each containing multiple filaments of the carbon fiber material 4, to be separated before entering or within the furnace 10 and to increase the direct surface area exposure of the individual tows to the boron oxide gas, a tow spreader 14 may be positioned before the reaction zone 8 of the furnace 10. To maintain separation of the tows during drawing of the carbon fiber material 4 through the reaction zone 8, sufficient tensile pull force may be maintained on the carbon fiber material 4.

The continuous boron carbide fibers may also be formed by a so-called "dip process" in which the carbon fiber material 4 is coated with a boron oxide composition. The carbon fiber material 4 may be immersed (i.e., dipped) in the boron oxide composition. The boron oxide composition may include a solution, suspension, dispersion, slurry, or emulsion of boron oxide in water. The boron oxide may be a solid, such as nanoparticles, of $B_2O_3$. The boron oxide composition may include from about 40% by weight to about 80% by weight of the boron oxide. The viscosity of the boron oxide composition may be sufficiently low to permit flow of the boron oxide composition and penetration into the carbon fiber material 4 but sufficiently high to adhere to the carbon fiber material 4. The carbon fiber material 4 may be immersed in the boron oxide composition one or a plurality of times to form a coating of boron oxide on the carbon fiber material 4 having a desired thickness. After removing excess boron oxide composition from the carbon fiber material 4 and drying, the carbon fiber material 4 coated with the boron oxide may be heated to directly form the continuous boron carbide fibers. The carbon fiber material 4 coated with the boron oxide may be heated, such as in a conventional high temperature tube furnace, to a temperature between approximately 1000° C. and approximately 2200° C., such as from approximately 1400° C. to approximately 1800° C. or from approximately 1550° C. to approximately 1800° C., to form the continuous boron carbide fibers.

The method of producing the continuous boron carbide fibers according to embodiments of the present disclosure is advantageous because the continuous boron carbide fibers may be produced on a large scale and at a low cost, with minimal capital investment compared to the cost of producing boron carbide fibers by conventional techniques. Additionally, by starting with a premade, carbon fiber material, the continuous boron carbide fibers may be formed without costly post-processing acts, enabling direct formation of the carbon fiber material into the continuous boron carbide fibers. It is estimated that continuous boron carbide fibers produced by the method of the present disclosure may have a total processing cost of from approximately $60 per pound to $150 per pound. In contrast, the cost of manufacturing boron carbide fibers by a conventional slurry powder conversion process may be about $1000 per pound and the cost of manufacturing boron carbide fibers by a conventional CVD process may be over $2000 per pound. In addition, the purity of the continuous boron carbide fibers produced by the method of the present disclosure may be higher than the purity of conventional boron carbide fibers due to the purity of the carbon fiber material and the purity of the boron oxide gas. The continuous boron carbide fibers may include minimal impurities (on the order of less than parts per million (ppm)), since the carbon fiber material and the boron oxide gas include low levels of impurities. The method of the present disclosure is also advantageous because the continuous boron carbide fibers may be produced by a continuous process.

Furthermore, when the partially converted, continuous boron carbide fibers are produced by the method of the present disclosure, minimal problems with adherence of boron carbide to the carbon fiber material are observed. Without being bound by any theory, it is believed that since the boron carbide is formed by reacting boron of the boron oxide gas and carbon of the carbon fiber material itself, the boron carbide is adherent to, or bonded to, the carbon fiber material. Therefore, the boron carbide includes carbon from the carbon fiber material. In contrast, adherence of the boron carbide to the carbon fiber material is a problem with conventional CVD processes of forming boron carbide fibers in which the boron carbide is a coating on the carbon fiber material.

The continuous boron carbide fibers may be utilized in a variety of articles or end products where high heat transfer, high use temperature, or stability to nuclear radiation is desired. By way of example, the continuous boron carbide fibers may have utility in the nuclear, aerospace, armor, heat management, marine, submarine, land transport (truck, bus, or automobile), and electronics industries, such as a fiber reinforcement in a ceramic matrix composite (CMC). The continuous boron carbide fibers may be used in articles including, but not limited to, heat exchangers, gas separation membranes, catalyst supports, filters, nuclear fuel containment, fusion reactor components, hot gas engines, turbine engines, hypersonic missile leading edges, tail sections, heat shields, jet vanes, space structure stabilization, chemical liners, metal matrix liners, pipes, nanoporous $B_4C$ structures, body frames, brake pads, body armor, vehicle armor, sporting goods, drill bits, wear bits, hypersonic missiles, or rocket components, such as rocket nozzles. In nuclear applications, the boron carbide fibers may be used in shielding, control rods, shut down pellets, fusion plasma facing components, such as radio frequency antennae, or injectors. By way of example, the continuous boron carbide fibers may be used in a cladding material, such as that described in U.S. patent application Ser. No. 13/178,884 to Garnier et al., filed Jul. 8, 2011, and entitled "REACTOR FUEL ELEMENTS AND RELATED METHODS," the disclosure of which is incorporated herein in its entirety by this reference. The continuous boron carbide fibers of the present disclosure may also be used as a fiber reinforcement in other materials, such as in metals, ceramics, metal-ceramics, glass, glass ceramics, graphite, carbon, or polymers. In addition, other materials utilized to provide internal structural support are foreseeable uses of the continuous boron carbide fibers of the present disclosure.

Figure 2:
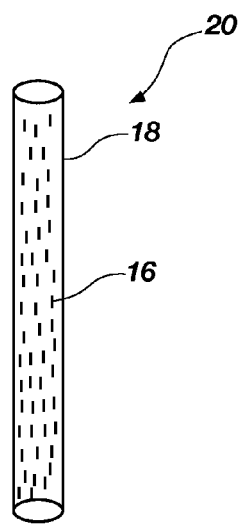
FIG. 2 is a schematic illustration of an article including continuous boron carbide fibers and a matrix according to embodiments of the disclosure.

As illustrated in FIG. 2, the continuous boron carbide fibers 12 may be divided or cut into boron carbide fibers 16 and utilized with a matrix 18 to form an article 20, such as a CMC, having desirable properties. The boron carbide fibers 16 may be dispersed or embedded within the matrix 18. The boron carbide fibers 16 may also be used in combination with silicon carbide fibers. The boron carbide fibers 16 may be incorporated into the matrix 18 by conventional techniques, which are, therefore, not described in detail herein, and shaped to produce the desired article 20. The matrix 18 may be a ceramic material, a refractory carbide material, or a metal material including, but not limited to, $B_4C$, silicon carbide (SiC), titanium diboride ($TiB_2$), titanium carbide (TiC), aluminum oxide ($Al_2O_3$), boron nitride (BN), boron (B), titanium (Ti), tantalum (Ta), vanadium (V), aluminum (Al), tungsten (W), chromium (Cr), niobium (Nb), silicon (Si), nickel (Ni), lead (Pb), molybdenum (Mo), zirconium (Zr), hafnium (Hf), magnesium (Mg), titanium aluminide ($Ti_3Al$).

Since the boron carbide fibers 16 formed from the continuous boron carbide fibers 12 have a low density, are stable at high temperatures (approximately 2100° C. or higher), and have high strength, the boron carbide fibers 16 may be used as a reinforcement in composite materials, such as in ceramic composites or metal composites. By utilizing the boron carbide fibers 16 in the matrix 18, the performance and safety utility in many CMCs may be significantly extended, especially in CMCs used in nuclear, turbine engine, or heat exchanger applications. By way of example, a CMC including the boron carbide fibers 16 and the matrix 18 may be used at a high temperature (greater than approximately 2100° C.) for a long period of time (greater than approximately two hundred hours), which exceeds the temperature and time period that conventional boron carbide fibers may be used.

The boron carbide fibers 16 may be used as a fiber reinforcement for ceramic or metal-ceramic articles used as nuclear control rod materials in a nuclear reactor including, but not limited to, a light water reactor (LWR), a pressurized water reactor (PWR), a liquid metal fast reactor (LMFR), a high temperature gas-cooled reactor (HTGR), or a steam-cooled boiling water reactor (SCBWR). The boron carbide fibers 16 may be used with the matrix 18 to produce articles 20, such as metal-ceramic tubes or ceramic tubes, to contain other conventional nuclear control materials. By way of example, the boron carbide fibers 16 and matrix 18 may be used to form tubes that contain boron carbide particles. The articles 20 may be more stable to irradiation than conventional articles used in the nuclear industry. Forming control rods or other tubes from the boron carbide fibers 16 and the matrix 18 may enable longer nuclear fuel use times (i.e., a higher fuel burn up), while imparting significant additional thermal and high temperature mechanical properties to the tubes in the event of a so-called "off-normal" event, such as loss of reactor core coolant. An off-normal event may cause mechanical damage to the fuel rod, adjacent rods or thermal-mechanical damage. Other articles 20 used in a nuclear environment that may contain the boron carbide fibers 16 and the matrix 18 include, but are not limited to, fuel control rods, fuel core channels or spreaders, fuel cladding, or other supporting structures inside nuclear reactor core regions. By using the boron carbide fibers 16 and the matrix 18 to form the article 20 to be used in the nuclear reactor, the fuel rod lifetime may be increased and safety margins may be significantly increased, which may have a major impact in nuclear power plant capital and operating costs. Articles 20 containing the boron carbide fibers 16 and the matrix 18 may replace all metal fuel rods or metal components in the reactor core. Given the resurgence in interest of nuclear energy worldwide, there is a major need for both safety and economical performance enhancements to power plant or other reactor operations. Use of the boron carbide fibers 16 in articles 20 for use in the nuclear industry may also result in reduced warpage of the articles 20 due to the properties of the boron carbide fibers 16.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A continuous method of producing continuous boron carbide fibers from a continuous carbon fiber material, comprising:
   heating a solid boron source to form a boron oxide gas in a reaction zone of a continuous throughput tube furnace having a single reaction zone in which both (i) the boron oxide gas is formed and (ii) the boron oxide gas is reacted with the continuous carbon fiber material;
   continuously drawing the continuous carbon fiber material through the continuous throughput tube furnace so that only a portion of the continuous carbon fiber material being converted to boron carbide is disposed within the reaction zone of the continuous throughput tube furnace at any given time, that portion of the continuous carbon fiber material disposed within the reaction zone reacting with the boron oxide gas in the reaction zone of the tube furnace to convert at least a portion of the carbon of the continuous carbon fiber material to boron carbide fiber as the carbon reacts with the boron oxide gas; and
   the reaction zone being maintained at a temperature within a range of from approximately 1400° C. to approximately 2200° C.

2. The method of claim 1, wherein the formed boron oxide gas is selected from the group consisting of diboron trioxide, diboron dioxide, boron monoxide, and combinations thereof.

3. The method of claim 1, wherein heating a solid boron source to form a boron oxide gas and reacting the boron oxide gas with a continuous carbon fiber material comprises heating a solid diboron trioxide to produce gaseous boron species and reacting the gaseous boron species with the continuous carbon fiber material.

4. The method of claim 1, wherein the continuous carbon fiber material comprises a material selected from the group consisting of a continuous pitch-based resin carbon fiber, a continuous polyacrylonitrile-based carbon fiber, a carbon nanotube, and combinations thereof.

5. The method of claim 1, wherein the reaction zone is maintained at a temperature within a range of from approximately 1600° C. to approximately 1800° C.

6. The method of claim 1, wherein the formed continuous boron carbide fibers have a stoichiometry of from $B_4C$ to $B_{10.4}C$.

7. The method of claim 6, wherein the formed continuous boron carbide fibers have a diameter of from approximately 2 μm to approximately 20 μm.

8. The method of claim 1, wherein the boron oxide gas is formed at a ratio greater than approximately 3 moles of carbon fiber material per mole of boron oxide gas.

9. The method of claim 1, wherein heating a solid boron source to form a boron oxide gas comprises heating solid boron trioxide.

10. The method of claim 1, wherein heating a solid boron source to form a boron oxide gas comprises heating a composition consisting of the solid boron source, the composition consisting of boron and oxygen.

11. The method of claim 1, wherein only a portion of the carbon of the continuous carbon fiber feedstock material is converted to boron carbide so as to form a conversion layer of boron carbide in fiber form on a continuous carbon fiber core.

12. The method of claim 1, wherein substantially all of the carbon of the continuous carbon fiber material is converted to boron carbide so as to form a homogeneous, continuous boron carbide fiber material.

13. The method of claim 12, wherein the continuous boron carbide fiber material consists essentially of boron carbide, so as to be substantially free of unreacted carbon.

14. The method of claim 1, further comprising maintaining a tensile pull force on the carbon fiber material as it is drawn through the continuous throughput tube furnace.

15. The method of claim 1, wherein the pressure within the continuous throughput tube furnace is maintained at a pressure of about 1 atm.

16. The method of claim 1, wherein the continuous carbon fiber material is in the form of an elongate, continuous, generally straight carbon fiber.

17. A continuous method of producing continuous boron carbide fibers from a continuous carbon fiber feedstock material that is continuously fed through a continuous throughput tube furnace, the method comprising:
   heating solid boron oxide in a reaction zone of the continuous throughput tube furnace having a single reaction zone to a first temperature greater than approximately 600° C. to form a boron oxide gas;
   increasing the temperature of the single reaction zone to a second temperature different from the first temperature, the second temperature being between approximately 1600° C. and approximately 2200° C.; and
   continuously drawing the continuous carbon fiber feedstock material through the single reaction zone in which the boron oxide gas was formed, only a portion of the continuous carbon fiber feedstock material being disposed within the single reaction zone at a given time, the boron oxide gas reacting with that portion of the continuous carbon fiber feedstock material disposed within the single reaction zone to convert at least a portion of the carbon of the continuous carbon fiber feedstock material to boron carbide furnace to convert at least a portion of the carbon of the continuous carbon fiber material to boron carbide fiber as the carbon reacts with the boron oxide gas.

18. The method of claim 17, wherein heating to a first temperature of greater than approximately 600° C. comprises forming at least one of diboron trioxide, diboron dioxide, or boron monoxide.

19. The method of claim 18, wherein drawing a continuous carbon fiber feedstock material through the reaction zone comprises reacting the continuous carbon fiber feedstock material with the at least one of diboron trioxide, diboron dioxide, or boron monoxide.

20. The method of claim 19, wherein drawing a continuous carbon fiber feedstock material through the reaction zone comprises reacting at least a portion of the continuous carbon fiber feedstock material with the at least one of diboron trioxide, diboron dioxide, or boron monoxide to convert a portion of the carbon of the continuous carbon fiber material so as to form a boron carbide fiber conversion layer on a carbon fiber core.

21. The method of claim 19, wherein drawing a continuous carbon fiber material through the reaction zone comprises reacting substantially all of the continuous carbon fiber feedstock material with the at least one of diboron trioxide, diboron dioxide, or boron monoxide to convert the carbon fiber feedstock material to the continuous boron carbide fiber material.

22. A continuous method of producing continuous boron carbide fiber from a continuous carbon fiber feedstock material, the method comprising:
  heating a composition comprising a solid boron source to form a boron oxide gas, the composition consisting of boron and oxygen; and
  reacting the boron oxide gas with the continuous carbon fiber feedstock material within a temperature range of from approximately 1400° C. to approximately 2200° C. to convert at least an outer portion of carbon of the continuous carbon fiber feedstock material to boron carbide fiber as the carbon of the fiber reacts with the boron oxide gas;
  the reacting the boron oxide gas with the continuous carbon fiber feedstock material being achieved by continuously drawing the carbon fiber through a reaction zone of a continuous throughput tube furnace so that only a portion of the continuous carbon fiber feedstock material is within the reaction zone of the continuous throughput tube furnace at any given time, that portion of the continuous carbon fiber feedstock material that is within the reaction zone at a given time reacting with the boron oxide gas, converting the carbon fiber feedstock material to the boron carbide fiber.

23. The method of claim 22, wherein heating a composition comprising a solid boron source to form a boron oxide gas comprises heating the composition to a temperature greater than approximately 600° C. and less than approximately 1650° C. to form a boron oxide gas comprising a greater gaseous molar concentration of diboron trioxide relative to a gaseous molar concentration of diboron dioxide, and a greater gaseous molar concentration of diboron dioxide relative to a gaseous molar concentration of boron monoxide.

24. The method of claim 22, wherein heating a composition comprising a solid boron source to form a boron oxide gas comprises heating the composition to a temperature between approximately 1650° C. and approximately 1750° C. to form a boron oxide gas comprising a greater gaseous molar concentration of diboron dioxide relative to a gaseous molar concentration of boron monoxide, and a greater gaseous molar concentration of boron monoxide relative to a gaseous molar concentration of diboron trioxide.

25. The method of claim 22, wherein heating a composition comprising a solid boron source to form a boron oxide gas comprises heating the composition to a temperature between approximately 1750° C. and approximately 2200° C. to form a boron oxide gas comprising a greater gaseous molar concentration of boron monoxide relative to a gaseous molar concentration of diboron dioxide, and a greater gaseous molar concentration of diboron dioxide relative to a gaseous molar concentration of diboron trioxide.

26. A continuous method of converting a continuous, elongate carbon fiber material into a continuous boron carbide fiber material, the method comprising:
  providing a boron oxide gas within a reaction zone of a continuous throughput tube furnace;
  continuously drawing the continuous carbon fiber material through the continuous throughput tube furnace so that only a portion of the continuous, elongate carbon fiber material is disposed within the reaction zone of the continuous throughput tube furnace at any given time, that portion of the continuous carbon fiber disposed within the reaction zone at a given time reacting with the boron oxide gas in the reaction zone of the tube furnace to convert at least an outside portion of the carbon of the continuous carbon fiber material to boron carbide fiber as the carbon reacts with the boron oxide gas;
  the reaction zone being maintained at a temperature within a range of from approximately 1400° C. to approximately 2200° C.;
  the reaction zone being maintained at a pressure of about 1 atm;
  wherein the method converts at least about 99.8% of the carbon of the continuous carbon fiber material into the elongate, continuous boron carbide fiber within a reaction time of less than about 10 minutes.

27. The method of claim 26, wherein the elongate, continuous boron carbide fiber produced by the method comprises at least 99% $B_4C$.

28. The method of claim 26, wherein the continuous carbon fiber material resides within the reaction zone for a period of time of less than 10 minutes such that only an outer portion of the carbon fiber is converted to boron carbide fiber, producing a fiber having a boron carbide conversion layer disposed about a carbon fiber core.

* * * * *

UNITED STATES PATENT AND TRADEMARK OFFICE
CERTIFICATE OF CORRECTION

| | | |
|---|---|---|
| PATENT NO. | : 9,199,227 B2 | Page 1 of 1 |
| APPLICATION NO. | : 13/215967 | |
| DATED | : December 1, 2015 | |
| INVENTOR(S) | : Garnier et al. | |

It is certified that error appears in the above-identified patent and that said Letters Patent is hereby corrected as shown below:

In the specification

Column 3
Line 48, change "or born carbide" to --or boron carbide--

Column 9
Line 4, change "are be formed" to --are to be formed--
Lines 52-53, change "into article" to --into an article--

Column 10
Line 51, change "the partially dense" to --then partially dense--

In the claims

Claim 17
Column 17, Lines 6-8, remove "furnace to convert at least a portion of the carbon of the continuous carbon fiber material to boron carbide fiber as the carbon reacts with the boron oxide gas"

Signed and Sealed this
Twelfth Day of April, 2016

Michelle K. Lee
*Director of the United States Patent and Trademark Office*